(12) United States Patent
Fujimoto et al.

(10) Patent No.: US 10,619,720 B2
(45) Date of Patent: Apr. 14, 2020

(54) TRANSMISSION

(71) Applicant: HONDA MOTOR CO., LTD., Minato-ku, Tokyo (JP)

(72) Inventors: Yasushi Fujimoto, Wako (JP); Kinya Mizuno, Wako (JP); Hiroyuki Makita, Wako (JP); Masashi Koyanagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 698 days.

(21) Appl. No.: 15/128,862

(22) PCT Filed: Mar. 24, 2015

(86) PCT No.: PCT/JP2015/058844
§ 371 (c)(1),
(2) Date: Sep. 23, 2016

(87) PCT Pub. No.: WO2015/146954
PCT Pub. Date: Oct. 1, 2015

(65) Prior Publication Data
US 2017/0108108 A1    Apr. 20, 2017

(30) Foreign Application Priority Data
Mar. 28, 2014 (JP) .................... 2014-069924

(51) Int. Cl.
*F16H 57/028* (2012.01)
*F16H 3/091* (2006.01)
(Continued)

(52) U.S. Cl.
CPC ........... *F16H 57/028* (2013.01); *F16C 19/06* (2013.01); *F16C 27/066* (2013.01);
(Continued)

(58) Field of Classification Search
CPC ...... F16H 3/091; F16H 57/021; F16H 57/028; F16H 57/031; F16H 57/0424;
(Continued)

(56) References Cited

U.S. PATENT DOCUMENTS

| 6,849,977 B2 * | 2/2005 | Walther | ................ F16C 25/083 |
| | | | 310/90 |
| 7,726,884 B2 * | 6/2010 | Hojo | ..................... F16C 25/083 |
| | | | 384/563 |

(Continued)

FOREIGN PATENT DOCUMENTS

| JP | H11-170880 A | 6/1999 |
| JP | 2009-180341 A | 8/2009 |

(Continued)

*Primary Examiner* — William C Joyce
(74) *Attorney, Agent, or Firm* — Carrier Blackman & Associates, P.C.; Joseph P. Carrier; Jeffrey T. Gedeon

(57) ABSTRACT

A transmission for a vehicle has a main shaft and a counter shaft, which are supported in a transmission case by bearings. Gears on the main shaft and gears on the counter shaft include: shifter gears which are not rotatable but axially movable relative to the shaft, and fixed gears which are rotatable but not axially movable relative to the shaft. Dog clutches are provided between the shifter gears and the fixed gears, and outer races of the bearings supporting the main and counter shafts are affixed to the transmission case. Vibration-absorbing elastic members are pressed against the outer races from axially outside and are set to have a volume of 50% or more of the volume of the outer races. With such configuration, the vibration of the bearings supporting both the main and counter shafts of the transmission is attenuated, and striking noise caused by shifting is reduced.

6 Claims, 6 Drawing Sheets

(51) Int. Cl.
    *F16C 19/06* (2006.01)
    *F16H 57/021* (2012.01)
    *F16C 27/06* (2006.01)
    *F16C 35/077* (2006.01)
    *F16H 57/031* (2012.01)
    *F16H 57/04* (2010.01)
    *F16C 35/07* (2006.01)

(52) U.S. Cl.
    CPC ........... *F16C 35/077* (2013.01); *F16H 3/091* (2013.01); *F16H 57/021* (2013.01); *F16H 57/031* (2013.01); *F16H 57/043* (2013.01); *F16H 57/0424* (2013.01); *F16H 57/0426* (2013.01); *F16C 35/07* (2013.01); *F16C 2361/65* (2013.01); *F16H 57/04* (2013.01)

(58) Field of Classification Search
    CPC ...... F16H 57/043; F16C 19/06; F16C 27/066; F16C 35/077; F16C 2361/65
    USPC .......................... 74/325; 384/517, 518, 563
    See application file for complete search history.

(56) References Cited

U.S. PATENT DOCUMENTS

| 8,127,635 B2 | 3/2012 | Tsukada et al. | |
|---|---|---|---|
| 8,662,253 B2 | 3/2014 | Terada et al. | |
| 2005/0078895 A1* | 4/2005 | Kanbe | F02F 7/0053 |
| | | | 384/432 |
| 2013/0255417 A1* | 10/2013 | Murao | F16H 1/12 |
| | | | 74/424 |

FOREIGN PATENT DOCUMENTS

| JP | 2011-064260 A | 3/2011 |
|---|---|---|
| JP | 2011-174618 A | 9/2011 |

* cited by examiner

TRANSMISSION

The present invention relates to a transmission of dog-clutch type for vehicles such as two-wheel motorcycles, capable of reducing striking noises produced during the shifting operation.

BACKGROUND ART

Patent Document 1 below, for example, discloses a transmission structure including a bearing for supporting a main shaft of a dog-clutch type transmission for two-wheel motorcycles.

Specifically, the disclosed structure employs a ball bearing as the bearing for supporting the main shaft. A lubricant guide member for regulating the amount of lubricant supplied in the main shaft is provided at a position axially outside of an outer race of the ball bearing. The lubricant guide member is pressed against the outer race by elastic force of an O-ring placed on the axially opposite side of the ball bearing.

Shifting or striking noises are sometimes produced during the speed change operation carried out by the dog-clutch type transmission.

In the transmission for saddle-type vehicles, a main shaft and a counter shaft are provided, and, generally, on each of these shafts are provided shifter gears that are axially shiftable, fixed gears that are axially not shiftable, and a dog clutches between the shifter and fixed gears. During the speed change operation in which the dog clutch between adjoining shifter and fixed gears is engaged, dog teeth of the dog clutch, rotating at different speeds, strike each other at their side surfaces, so that shifting or striking noises are sometimes produced. The striking noises accompanied by vibrations are produced at the striking area of the dog clutch teeth, and the vibrations are transmitted from the gear teeth of the dog clutch to the main shaft or the counter shaft, to the outer race of the ball bearing supporting the main shaft or the counter shaft, to the part of the transmission case supporting the outer race, to the transmission case, and to the transmission cover, so that striking noises are released to the outside of the transmission.

Though the Patent Document 1 below does not mention in detail, the use of the lubricant guide member pressed against the outer race of the bearing by elastic force of the O-ring is useful to some degree to reduce vibrations of the outer race, resulting from vibrations produced in the engaging area of the dog clutch teeth during the speed change operation. Therefore the use of the lubricant guide member pressed against the bearing outer race is expected to have a vibration reducing effect to a certain degree during the speed change operation.

However, the lubricant guide member pressed against the ball bearing is made of metal, so that the ball bearing and the lubricant guide member are supposed to integrally vibrate together. Therefore, the ball bearing and the lubricant guide member are considered to perform a certain vibration-preventing effect on the ball bearing and so on, but the effect is low because the volume of the O-ring cannot be enough. The same is true in case the bearing is a roller bearing and the like.

For this reason, further reduction of the striking noises in relation to the known structure is required.

PRIOR ART DOCUMENT

Patent Document

Patent Document 1: JP 2011-64260 A (FIGS. 3-5)

DISCLOSURE OF THE INVENTION

Problem to be Solved by the Invention

The present invention is made in view of the foregoing, and the underlying problem of the invention is to further reduce the striking noises in the transmission of dog clutch type, by reducing vibrations of the bearing for supporting the main shaft or the counter shaft.

Means for Solving the Problem

To solve the above underlying problem, the present invention provides a transmission comprising a main shaft having thereon a plurality of first gears and supported through a bearing by a transmission case, and a counter shaft having a plurality of second gears thereon and supported through a bearing by the transmission case, the first gears including shifter gears not rotatable but axially shiftable relative to the main shaft and fixed gears rotatable but axially not shiftable relative to the main shaft, the second gears including shifter gears not rotatable but axially shiftable relative to the counter shaft and fixed gears rotatable but axially not shiftable relative to the counter shaft, dog clutches being interposed between the shifter gears and the fixed gears, respectively; wherein each of the bearings includes an inner race, and an outer race fixedly mounted in the transmission case; characterized in that a vibration-absorbing elastic member is provided so as to be pressed from outside toward at least one of the bearings against the outer race of the one bearing for the main or counter bearings; and the vibration-absorbing elastic member is set to have a volume of 50% or more of a volume of the outer race, pressed against the same, of the one bearing.

According to a preferred embodiment of the invention, the vibration-absorbing elastic member has an abutment surface in abutment with the associated outer race, and a cone-shaped cap member made of a metal is provided to extend integrally and axially outward and radially inward on axially opposite side of the abutment surface. Further, the transmission case has a transmission front cover positioned to confront the cone-shaped cap member and formed with a protruding boss having a female screw hole therein, and a tightening bolt is screwed in the female screw hole to fixedly secure the cone-shaped cap member to the transmission front cover.

Preferably, at least one of the main and counter shafts, with which the vibration-absorbing elastic member is associated, has a lubricant passage therein; and the tightening bolt screwed in the female screw hole has therein a connecting lubricant passage communicating with a lubricant supply passage.

According to a further preferred embodiment of the invention, the vibration-absorbing elastic member has an abutment surface in abutment with the associated outer race, and a cap part integrally extending axially outward and radially inward, and the transmission case has a bearing holding part with a bearing positioning shoulder part in abutting engagement with the associated outer races, and a cap part positioning shoulder part in abutting engagement with the cap part. Further, the vibration-absorbing elastic member is set to have an interference or tightening degree relative to the associated outer race, depending on axial distance between the bearing positioning shoulder part and the cap part positioning shoulder part.

Preferably, at least one of the main and counter shafts, with which the vibration-absorbing elastic member is associated, has a lubricant passage, and the cap part has therein a lubricant passage for supplying lubricant into at least one of the main and counter shafts.

Preferably, the transmission case has a transmission cover with a lubricant supply hole formed therein, and a lubricant supply bolt communicating with the lubricant supply hole is tightly fitted in the cap part to form the lubricant passage.

Desirably, the vibration-absorbing elastic member is set to have a volume of 100% or more of a volume of the outer race, pressed against the same, of the one bearing.

Effect of the Invention

According to the present invention, vibrations of the outer race of the bearing can be effectively suppressed by pressing, against the outer race, the vibration-absorbing elastic member having a volume of 50% or more of a volume of the outer race.

Vibrations that occur at the engaging teeth of the dog clutches when the dog clutches mesh with each other, are transmitted from the dog clutch teeth to the main shaft or the counter shaft and to the outer race of the bearing for supporting each of the shaft. Such vibrations can be suppressed by the measures taken by the present invention.

As a result, vibrations transmitted from the outer race supporting portion of the transmission case to the transmission, the transmission case and the transmission cover are reduced, whereby striking sounds released to the outside of the transmission can be reduced or suppressed.

According to an embodiment of the invention, the cone-shaped cap member made of metal is fixedly secured to the transmission front cover in a state of interference fit between the transmission front cover and the bearing outer race, whereby the vibration-absorbing elastic member can be reliably pressed against the bearing outer race.

According to a further embodiment of the invention, the vibration-absorbing elastic member is not only used to absorb vibrations but also utilized, making use of the sealing property of the elastic member, to supply lubricant from the side of the transmission cover through the tightening bolt passage with the interior of the cone-shaped cap member used as lubricant flow passage.

In an embodiment of the invention, the vibration-absorbing elastic member is made of rubber integrally with the cap part, so that the vibration-absorbing elastic member is less costly. Further, because of the construction of the bearing positioning shoulder part, it is possible to adjust the interference or tightening degree of the vibration-absorbing elastic member relative to the associated outer race. As a consequence, the vibration-absorbing elastic member can be reliably pressed against the bearing outer race without increasing the number of elements used.

In a preferred embodiment of the invention, the vibration-absorbing elastic member is used not only to suppress vibrations but also to make use of the interior of the cap part as a lubricant passage by connecting it to a lubricant supply source.

In a preferred embodiment of the invention, lubricant can be supplied from the transmission cover into the cap part with a simple construction.

Furthermore, by setting the volume of the vibration-absorbing elastic member to be 100% or more of a volume of the bearing outer race, a maximum vibration-absorbing effect of the vibration-absorbing elastic member on the bearing outer race is obtained.

BEST MODE FOR CARRYING OUT THE INVENTION

Figure 1:
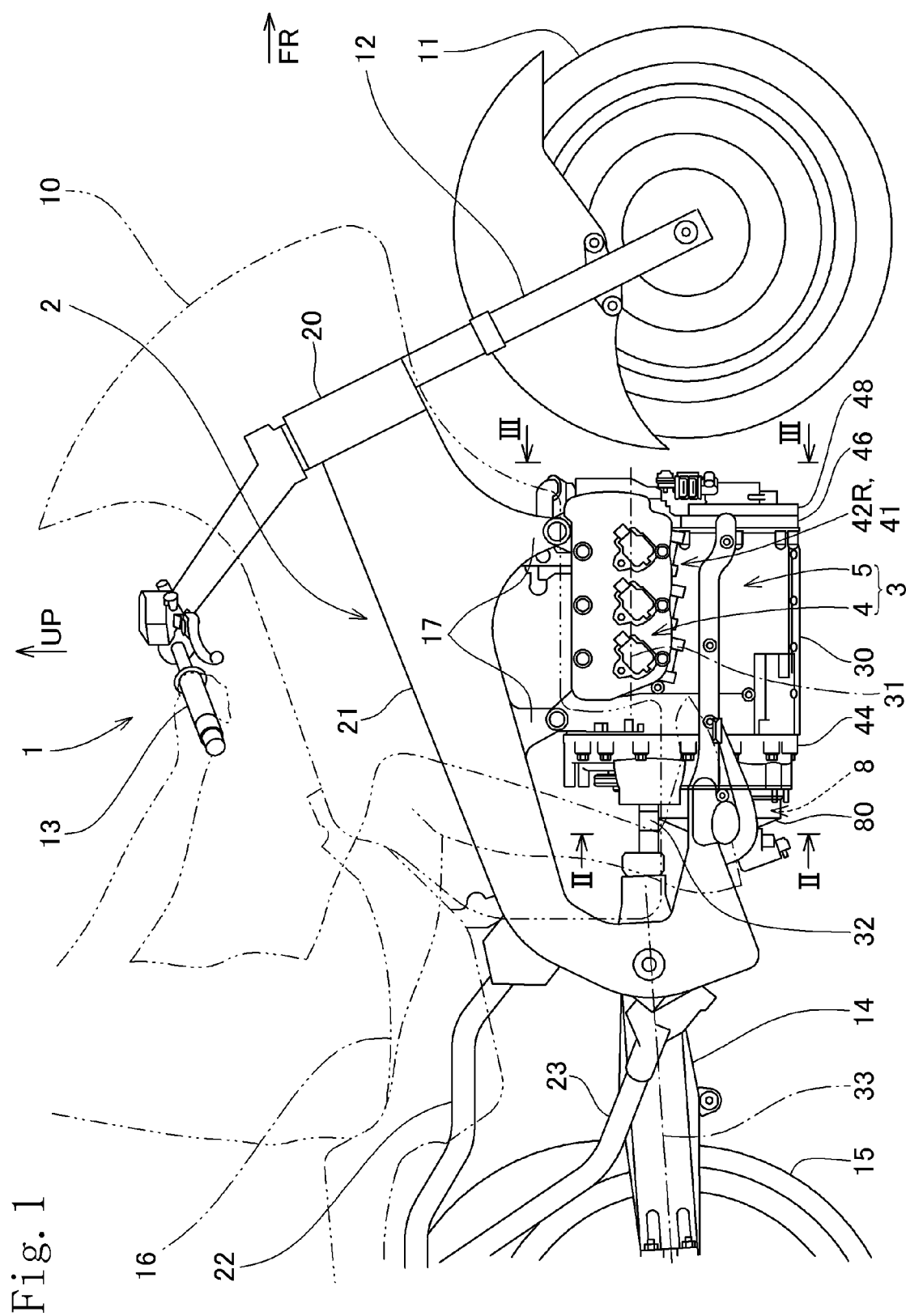
FIG. 1 is right-side view of a two-wheel motorcycle having a power unit provided with a transmission according to an embodiment of the invention.

A transmission according to an embodiment of the present invention will be described with reference to FIGS. 1 to 6 of the drawings.

In the following description and the claims, "front", "rear", "left", "right", "upper", "lower", etc. are used to mean directions with respect a vehicle on which is mounted a power unit provided with the transmission according to an embodiment of the invention. In the embodiment of the invention, the vehicle is a saddle-type vehicle, in particular, a two-wheel motorcycle.

In the drawings, FR shows a front direction of the vehicle, LH a leftward direction of the vehicle, RH a rightward direction of the vehicle, and UP an upward direction of the vehicle.

FIG. 1 shows a right-side view of the two-wheel motorcycle on which is mounted a power unit provided with the transmission according to an embodiment of the invention.

In FIG. 1, the two-wheel motorcycle is generally indicated by reference numeral 1, and a body cover or cowl 10 is shown simply in two-dot chain line with some portions thereof omitted. The engine intake system, the discharge system, the fuel supply system, and so on are omitted or shown in simplified manner in the figure.

The two-wheel motorcycle 1 has a body frame 2 including a head pipe 20 supporting therein a front fork 12, for steering, rotatably supporting a front wheel 11, a main frame 21 extending rearward and downward, seat rails 22 extending rearward and slightly upward from an upper portion of the rear end of the main frame 21, and back stays 23 connecting a lower portion of the rear end of the main frame 21 to a rear portions of the seat rails 22.

To the upper end of the front fork 12 is connected a steering handle 13. To the rear end of the main frame 21 is supported the front end of a swing arm member 14 in a manner to be swingable up and down, and the rear end of the swing arm member 14 rotatably supports a rear wheel 15 which is a drive wheel.

A rear cushion unit not shown is provided to extend between an upper portion of the rear end of the main frame 21 and the swing arm member 14. A seat 16 for driver is mounted on the seat rails 22.

In the space below the main frame 21 is provided a power unit 3 for driving the rear wheel 15. The power unit 3 is supported by the main frame 21 through a plurality of hanger members 17.

The power unit 3 has an output shaft 32, which is connected to the rear wheel 15 thorough a drive shaft 33 to transmit the rotary power to the rear wheel 15.

Figure 2:
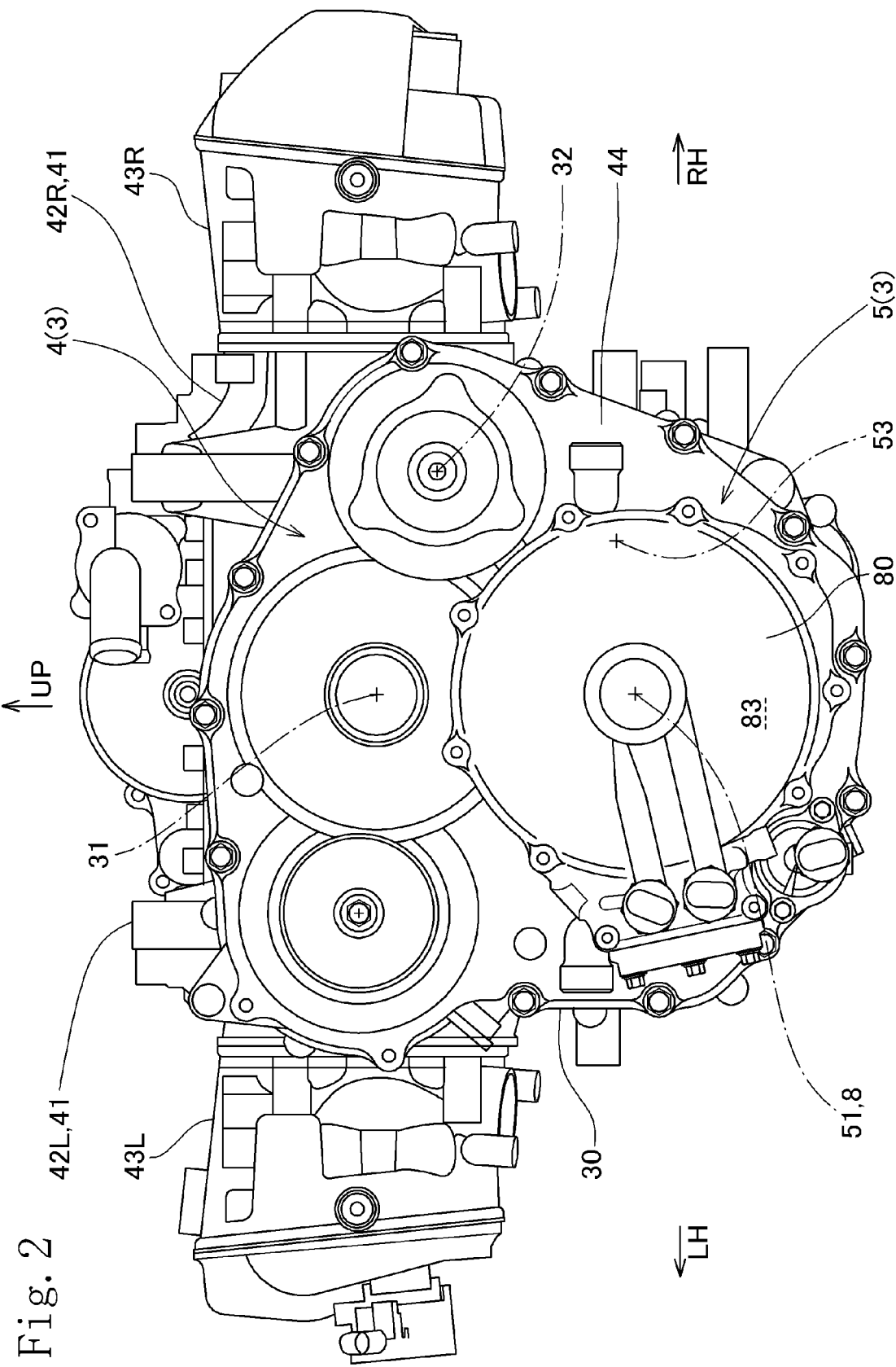
FIG. 2 is a rear-side view of the power unit, as viewed in the direction of the line II-II in FIG. 1.

FIG. 2 shows a rear-side view of the power unit 3, as viewed in the direction of the line II-II in FIG. 1.

As indicated in FIGS. 0.1 and 2, the power unit 3 is made up of an internal combustion engine 4 of four-stroke cycle, water-cooled, six-cylinder, horizontally-opposed type engine, and a transmission 5 for converting the output rotary power of the engine for speed change. The transmission 5 is provided with a hydraulic-type clutch mechanism 8 (see FIG. 1) to be described later.

The internal combustion engine 4 includes an engine body 41, a left engine block section 42L disposed on the left side as viewed in the running direction of the two-wheel motor-cycle 1, a right engine block section 42R disposed on the right side as viewed in the running direction of the motor-cycle 1, left and right cylinder head sections 43L and 43R connected respectively to the outside walls of the left and right engine block sections 42L and 42R, and a rear cover 44 connected to both the left and right engine block sections 42L and 42R. The rear cover 44 is joined to the rear portion of a crankcase 30 to close the same with respect to the running direction of the motorcycle 1.

The left and right engine block sections 42L and 42R have therein pistons not shown, respectively, and the pistons are joined to a common crankshaft 31 with its center axis extending in the front-to-rear direction of the motorcycle 1 through connecting rods not shown, respectively. The crankshaft 31 is rotatably supported in the crankcase 30.

To the rear surface of the rear cover 44 is attached a clutch cover 80, which covers the hydraulic-type clutch mechanism 8. As will be noted from FIG. 2, the clutch mechanism 8 is disposed coaxially with a main shaft 51, described later, of the transmission 5, and an output shaft 32 of the power unit 3 projects rearward from the rear cover 44.

The output shaft 32 extends along the swing arm member 14 and is connected to the rear wheel 15 through a drive shaft 33 (see FIG. 1) to thus transmit the rotary power of the engine 4 to the rear wheel.

Figure 3:
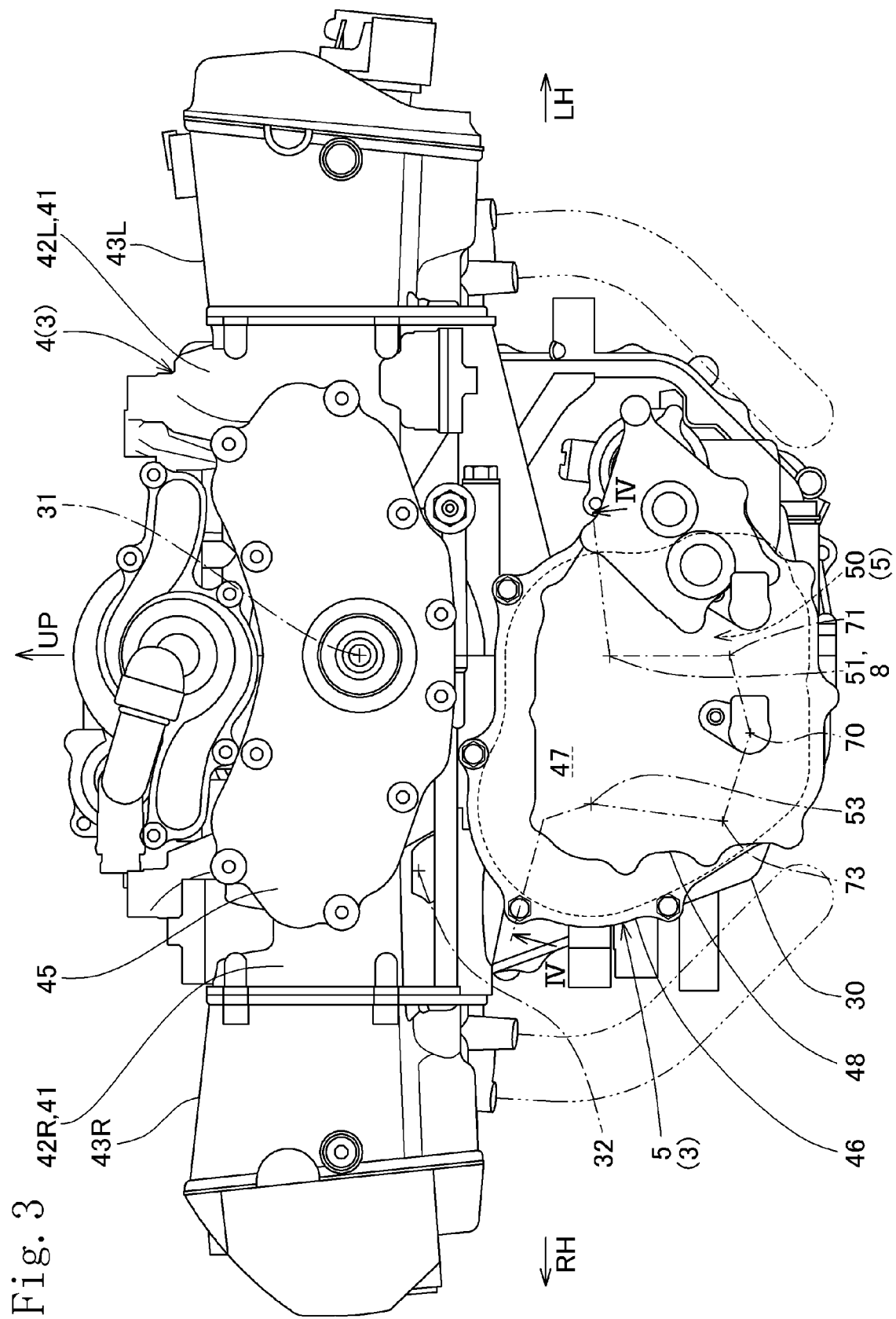
FIG. 3 is a front-side view of the power unit, as viewed in the direction of the line III-III in FIG. 1.

FIG. 3 shows a front-side view of the power unit 3, as viewed in the direction of the line III-III in FIG. 1.

As shown in FIG. 3, a front cover 45 is provided to close the front side of the crankcase 30, which encases the crankshaft 31 and connects the left and right engine block sections 42L and 42R. A transmission holder 46 is provided to form a part of the housing for the transmission. The transmission holder 46 is located around the main shaft 51 and a counter shaft 53 (FIG. 4), a shift drum 70 (FIG. 4) forming a component of a part of a gear change mechanism 7, a fork shaft 71 associated with the main shaft, and a fork shaft 73 associated with the counter shaft, the centers of the fork shafts 71 and 73 being shown in FIG. 3. The transmission holder 46 is joined to the left and right engine block sections 42L and 42R so as to close the front side of the crankcase 30.

A transmission space 47 is defined in the crankcase 30 and closed by the transmission holder 46, and a gear change mechanism 50 to be described below is placed in the transmission space 47.

Figure 4:
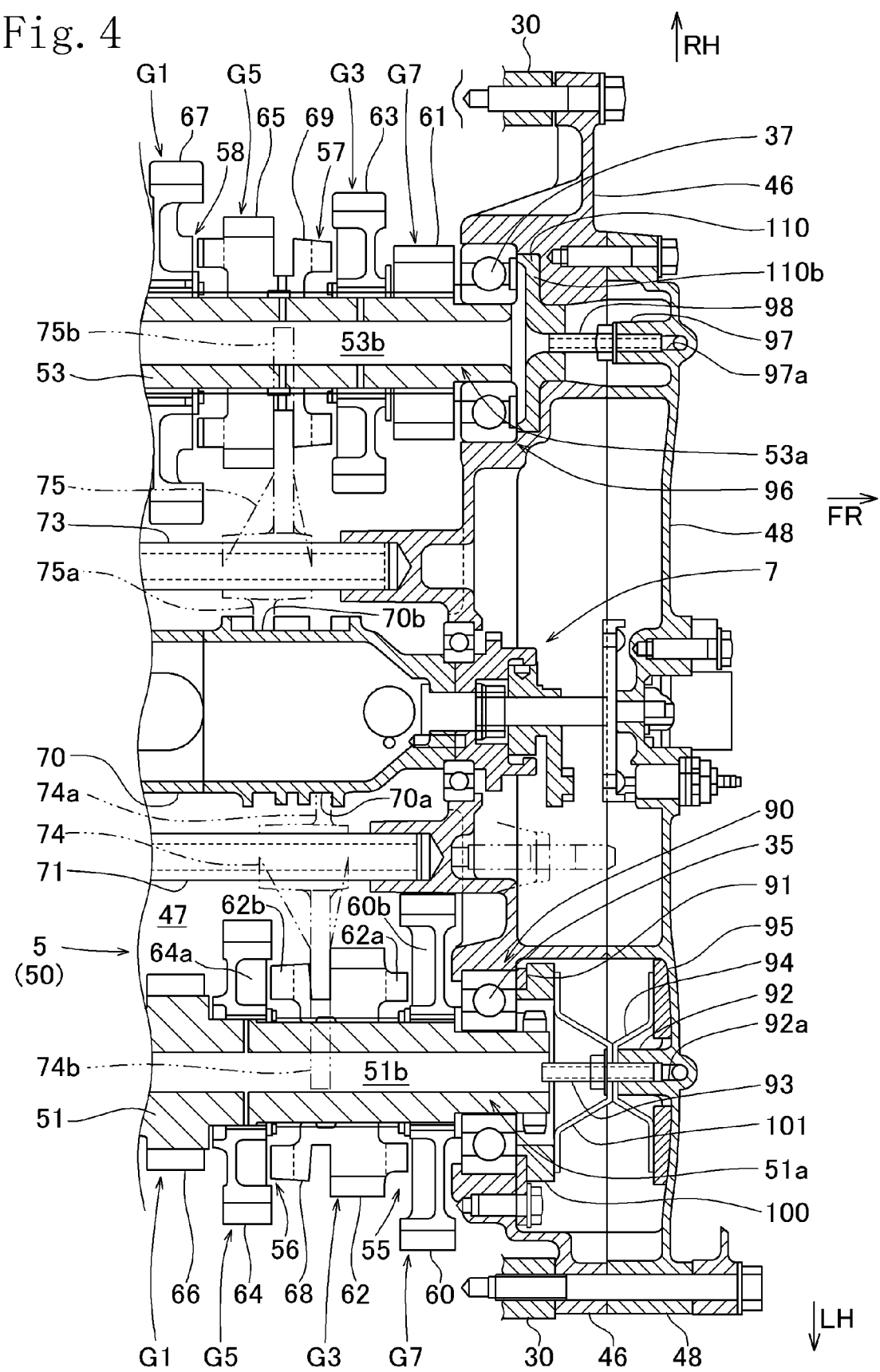
FIG. 4 is a developed section of the transmission, taken along the lines IV-IV in FIG. 3.

FIG. 4 shows a developed section of the transmission 5, taken along the lines IV-IV in FIG. 3.

The transmission 5 is made up of the gear change mechanism 50, and the hydraulic clutch mechanism 8 (FIG. 1) provided between the gear change mechanism 50 and the crankshaft 31.

The clutch mechanism 8 is provided with a primary driven gear, not shown, which is in mesh with a primary drive gear, not shown, provided on the crankshaft 31, the arrangement being such that the rotary power of the crankshaft 31 is transmitted through the clutch mechanism 8, which can be connected or disconnected, to the gear change mechanism 50 of the transmission 5 to be finally transmitted to the rear wheel 15.

The construction, function and operation of the clutch mechanism 8 are well known and will not be explained here in detail.

The gear change mechanism 50 in the transmission space 47 contains speed change gear trains with plural gear change ratios, which gear trains are on the main shaft 51 connected to the clutch mechanism 8 in the rear part (not shown in FIG. 4) to be driven in rotation by the engine rotary power and also on the counter shaft 53 connected to the output shaft 32 in the rear part not shown in the figure.

In the embodiment of the invention disclosed, there are provided $1^{st}$ to $7^{th}$ gear trains, which are, from the front side 51a of the main shaft 51 and the front side 53a of the counter shaft 53, the $7^{th}$ gear train G7, the $3^{rd}$ gear train G3, the $5^{th}$ gear train G5, the $1^{st}$ gear train G1, the $6^{th}$ gear train, the $4^{th}$ gear train and the $2^{nd}$ gear train. FIG. 4 shows only the $7^{th}$ gear train G7 to the $1^{st}$ gear train G1 from the front sides 51a and 53a.

The main shaft 51 and the counter shaft 53 extend in parallel with the crankshaft 31. On the main shaft 51, to which the rotary power of the engine 4 is input, are supported drive gears 60, 62, 64, 66 . . . in this order from the front side 51a, and on the counter shaft 53, parallel to the main shaft 51, are supported driven gears 61, 63, 65, 67 . . . meshing with the above drive gears, respectively, in this order from the front side 53a. These drive gears and driven gears constitute the above-mentioned $7^{th}$ gear train G7, the $3^{rd}$ gear train G3, the $5^{th}$ gear train G5, the $1^{st}$ gear train G1.

Since FIG. 4 is a developed section of the transmission, taken along the lines IV-IV in FIG. 3, the fork shaft 71 associated with the main shaft, the shift drum 70, and the fork shaft 73 associated with the counter shaft are shown in FIG. 4 as being located between the main shaft 51 and the counter shat 53. In reality, however, the main shaft 51 and the counter shat 53 are located in parallel adjoining relationship as indicated in FIG. 3. Further, the $7^{th}$ drive and driven gears 60 and 61, the $3^{rd}$ drive and driven gears 62 and 63, the $5^{th}$ drive and driven gears 64 and 65, and the $1^{st}$ drive and driven gears 66 and 67 are constantly in mesh with each other to form the gear trains G7, G3, G5 and G1, respectively.

The crankcase 30 has a rear opening with respect to the axial direction of the crankshaft 31, that is, the front-to-rear direction of the motorcycle 1, and the rear opening is covered by the rear cover 44 (FIG. 2). The crankcase 30 has a front opening covered by a front cover 48 and the transmission holder 46 (FIG. 3).

The rear end portions of the shafts 51 and 53 of the gear change mechanism 50 are supported by the rear cover 44 through bearings not shown, and the front end portions 51a and 53a of the shafts 51 and 53 are supported by the transmission holder 46 through ball bearings 35 and 37, respectively.

The front cover 48 as a transmission cover is fixedly joined to the front side of the transmission holder 46 so as to cover the ball bearings of the transmission holder 46.

The $7^{th}$ drive gear 60 of the $7^{th}$ gear train G7 is a gear as a "fixed gear" axially shiftable and rotatable relative to the main shaft 51, and the $7^{th}$ driven gear 61 is in mesh with the $7^{th}$ drive gear 60 and supported on the counter shaft 53 in a manner not rotatable relative to the counter shaft 53.

The $3^{rd}$ drive gear 62 of the $3^{rd}$ gear train G3 is a gear axially shiftable but not rotatable relative to the main shaft 51, and the $3^{rd}$ driven gear 63 is a gear as a "fixed gear" in mesh with the $3^{rd}$ drive gear 62 and supported on the counter shaft 53 in a manner axially not shiftable but rotatable relative to the counter shaft 53.

The $5^{th}$ drive gear 64 of the $5^{th}$ gear train G5 is a gear as a "fixed gear" axially not shiftable but rotatable relative to the main shaft 51, and the $5^{th}$ driven gear 65 is a gear in mesh with the $5^{th}$ drive gear 64 and supported on the counter shaft 53 in a manner axially shiftable but not rotatable relative to the counter shaft 53.

The $1^{st}$ drive gear 66 of the $1^{st}$ gear train G1 is a gear axially not shiftable and not rotatable relative to the main shaft 51, and the $1^{st}$ driven gear 67 is a gear as a "fixed gear" in mesh with the $1^{st}$ drive gear 66 and supported on the counter shaft 53 in a manner axially not shiftable but rotatable relative to the counter shaft 53.

A $1^{st}$ shifter 68 is provided on the main shaft 51 between the $7^{th}$ drive gear 60 and the $5^{th}$ drive gear 64. The $1^{st}$ shifter 68 is not rotatable relative to the main shaft 51 but axially shiftable to take a position meshing with the $7^{th}$ drive gear 60, a position meshing with the $5^{th}$ drive gear 64, or a position not meshing with any one of the $7^{th}$ drive gear 60 and the $5^{th}$ drive gear 64. The $1^{st}$ shifter 68 has the above-mentioned $3^{rd}$ drive gear 62, as a shifter gear, integrally formed therewith.

On the rear portion, not shown, of the main shaft 51 is also provided a similar shifter gear.

A $2^{nd}$ shifter 69 is provided on the counter shaft 53 between the $3^{rd}$ driven gear 63 and the $1^{st}$ driven gear 67. The $2^{nd}$ shifter 69 is not rotatable relative to the counter shaft 53 but axially shiftable to take a position meshing with the $3^{rd}$ driven gear 63, a position meshing with the $1^{st}$ driven gear 67, or a position not meshing with any one of the $3^{rd}$ driven gear 63 and the $1^{st}$ driven gear 67. The $2^{nd}$ shifter 69 has the above-mentioned $5^{th}$ driven gear 65, as a shifter gear, integrally formed therewith.

On the rear portion, not shown, of the counter shaft 53 is also provided a similar shifter gear.

The $1^{st}$ gear train G1 is established by causing the $5^{th}$ driven gear (shifter gear) 65 integral with the $2^{nd}$ shifter 69 to mesh with the $1^{st}$ driven gear (fixed gear) 67 of the $1^{st}$ gear train.

The $3^{rd}$ gear train G3 is established by causing the $5^{th}$ driven gear (shifter gear) 65 integral with the $2^{nd}$ shifter 69 to mesh with the $3^{rd}$ driven gear (fixed gear) 63 of the $3^{rd}$ gear train, in the state that the $3^{rd}$ drive gear (shifter gear) 62 integral with the $1^{st}$ shifter 68 is not in mesh with both the $7^{th}$ drive gear 60 and the $5^{th}$ drive gear 64.

The $5^{th}$ gear train G5 is established by causing the $3^{rd}$ drive gear (shifter gear) 62 integral with the $1^{st}$ shifter 68 to mesh with the $5^{th}$ drive gear (fixed gear) 64 of the $5^{th}$ gear train, in the state that the $5^{th}$ driven gear (shifter gear) 65 integral with the $2^{nd}$ shifter 69 is not in mesh with both the $3^{rd}$ driven gear 63 and the $1^{st}$ driven gear (fixed gear) 67.

The $7^{th}$ gear train G7 is established by causing the $3^{rd}$ drive gear (shifter gear) 62 integral with the $1^{st}$ shifter 68 to mesh with the $7^{th}$ drive gear (fixed gear) 60.

The $6^{th}$ gear train, $4^{th}$ gear train and $2^{nd}$ gear train, which are not shown, are established similarly by the operation of the shifter gears.

As shown in FIGS. 3 and 4, the shift drum 70, the fork shaft 71 associated with the main shaft, and the fork shaft 73 associated with the counter shaft, which are components of the gear change mechanism 7, are located within the transmission space 47, in parallel arrangement with the main shaft 51, the counter shaft 53 and the crankshaft 31.

A first shift fork 74 is provided on the fork shaft 71 associated with the main shaft. The shift fork 74 is not rotatable but axially shiftable relative to the fork shaft 71. The shift fork 74 has one end 74a thereof in engagement with a drum groove 70a formed in the outer surface of the shift drum 70, and the other end 74b of the shift fork 74 is in engagement with the $1^{st}$ shifter 68 on the main shaft 51.

A $2^{nd}$ shift fork 75 is provided on the fork shaft 73 associated with the counter shaft. The shift fork 75 is not rotatable but axially shiftable relative to the fork shaft 73. The shift fork 75 has one end 75a thereof in engagement with another drum groove 70b formed in the outer surface of the shift drum 70, and the other end 75b of the $2^{nd}$ shift fork 75 is in engagement with the $2^{nd}$ shifter 69 on the counter shaft 53.

When the shift drum 70 is rotated to a predetermined rotary position by the control operation of the gear change mechanism 7, the $1^{st}$ and $2^{nd}$ shift forks 74 and 75 are shifted along the fork shaft 71 associated with the main shaft and along the fork shaft 73 associated with the counter shaft, under the guidance of the drum grooves 70a and 70b with which the one ends 74a and 75a of the shift forks 74 and 75 are in engagement, respectively, so that the other ends 74b and 75b of the $1^{st}$ and $2^{nd}$ shift forks 74 and 75 cause axial shifting movements of the $3^{rd}$ drive gear (shifter gear) 62 integral with the $1^{st}$ shifter 68 and the $5^{th}$ driven gear (shifter gear) 65 integral with the $2^{nd}$ shifter 69, respectively, whereby meshing engagements of the drive and driven gears with the fixed gears are made selectively.

Also in the rear regions of the main and counter shafts 51 and 53, similar operation of the shift forks and shift gears due to the rotation of the shift drum 70 is carried out to establish meshing engagement of the drive and driven gears with the fixed gears.

Gear train change operations for different states of power transmission are carried out as described above, and speed change operation is performed by the gear change mechanism 7 of the transmission 5.

The transmission 5 according to the invention is of dog clutch type, and meshing engagement operations of the shifter gears and the fixed gears are carried out by using the dog clutches.

The $3^{rd}$ drive gear (shifter gear) 62 integral with the $1^{st}$ shifter 68 is formed with dog teeth 62a projecting toward the confronting side of the $7^{th}$ drive gear 60, while the $7^{th}$ drive gear 60 is formed with dog teeth 60b projecting toward the $3^{rd}$ drive gear 62. These dog teeth 62a and 60b constitute a dog clutch 55.

When the $3^{rd}$ drive gear 62 is shifted to the front by the first shift fork 74, the dog teeth 62a are positioned between the dog teeth 60b, whereby the dog clutch 55 is engaged so that the shifter gear and the fixed gear are brought into engagement. On the other hand, when the $3^{rd}$ drive gear 62 is shifted to the rear, the dog teeth 62a are separated from the dog teeth 60b, whereby the dog clutch 55 is disengaged so that the engagement of the shifter gear with the fixed gear is released.

The $3^{rd}$ drive gear (shifter gear) 62 integral with the $1^{st}$ shifter 68 is formed with dog teeth 62b projecting toward the confronting side of the $5^{th}$ drive gear (fixed gear) 64, while the $5^{th}$ drive gear 64 is formed with dog teeth 64a projecting toward the $5^{th}$ drive gear 64. These dog teeth 62b and 64a constitute a dog clutch 56.

When the $3^{rd}$ drive gear 62 is shifted to the rear by the first shift fork 74, the dog teeth 62b are positioned between the dog teeth 64a, whereby the dog clutch 56 is engaged so that the shifter gear and the fixed gear are brought into meshing engagement. On the other hand, when the $3^{rd}$ drive gear 62 is shifted to the front, the dog teeth 62b are separated from the dog teeth 64a, whereby the dog clutch 56 is disengaged so that the engagement of the shifter gear with the fixed gear is released.

The $3^{rd}$ drive gear (shifter gear) 62 can be moved by the first shift fork 74 to take an intermediate position in which the $3^{rd}$ drive gear 62 engage neither the $7^{th}$ drive gear (fixed gear) 60 nor the $5^{th}$ drive gear (fixed gear) 64.

The $5^{th}$ driven gear (shifter gear) 65 integral with the $2^{nd}$ shifter 69 is formed with the dog clutch 57 between the $5^{th}$ driven gear 65 and the $3^{rd}$ driven gear (fixed gear) 63 and with the dog clutch 58 between the $5^{th}$ driven gear 65 and the $1^{st}$ driven gear (fixed gear) 67. Similarly, the $5^{th}$ driven gear 65 can be moved by the shifting movement of the $2^{nd}$ shift fork 75 to take a position in engagement with the $3^{rd}$ driven gear (fixed gear) 63, a position in engagement with the $1^{st}$ driven gear (fixed gear) 67, or a position not in engagement with any one of the $3^{rd}$ driven gear and the $1^{st}$ driven gear 67.

Also in the rear parts of the main shaft 51 and the counter shaft 53, similar dog clutches are provided between shifter gears and fixed gears to selectively carry out mutual engagement and disengagement.

During the speed change operation in the transmission 5 according to the embodiment of the invention, each of the dog clutches is operated for engagement between the shifter gear and the fixed gear, accompanied by mutual striking, with a rotational speed difference between the side surfaces of the dog teeth of these gears. This results in production of striking noises during the shifting operation. The embodiment of the invention is intended to enable reduction of the striking noises by using the measures to be described below.

Figure 5:
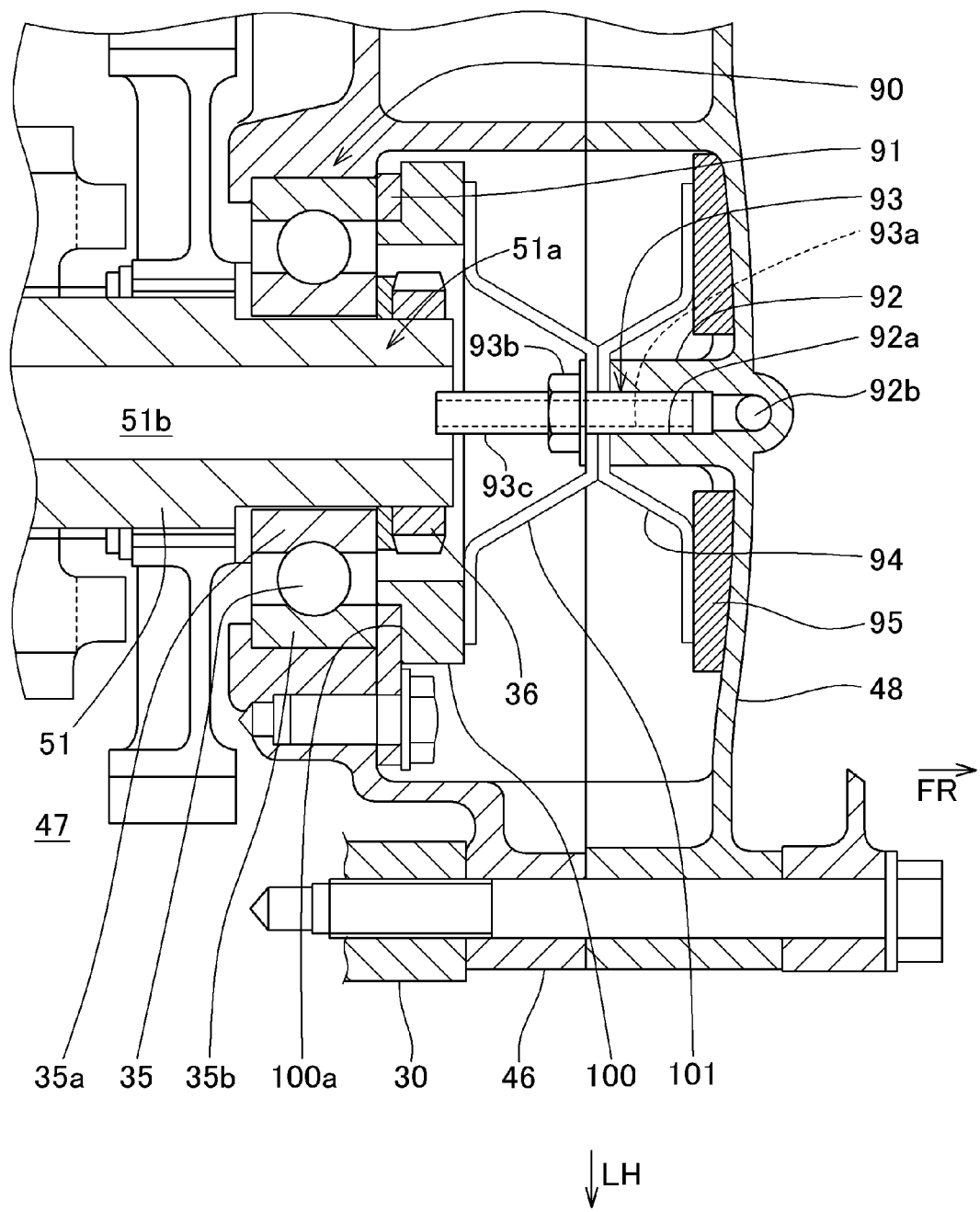
FIG. 5 is an enlarged view showing a part including a ball bearing for a main shaft and a vibration-absorbing elastic member shown in FIG. 4.

As shown in FIG. 4 and in FIG. 5 in more detail, the front side 51a of the main shaft 51 is supported through a ball bearing 35 in a main bearing holding part 90 forming a part of the transmission holder 46. The ball bearing 35 has its inner race 35a fixedly fitted on the front side 51a of the main shaft 51, while an outer race 35b of the ball bearing 35 is prevented to move toward the outside (front) by means of a suppressing plate 91.

In front of the transmission holder 46, the transmission front cover 48 forming a part of the transmission cover is fixedly secured to cover the main bearing holding part 90 and so on. The inner surface of the front cover 48 is formed with an inwardly (rearwardly) protruding boss 92 in which is formed a female screw hole 92a coaxial with the main shaft 51.

The female screw hole 92a is connected to a lubricant passage 92b formed in the front cover 48 to be connected to a lubricant supply source not shown.

A tightening bolt 93 is screwed into the female screw hole 92a from the inside of the transmission front cover 48. A cone-shaped member 94 has a cone top portion in abutment with the end surface of the boss 92 and extends from the top portion axially outward and radially outward. The tightening bolt 93 fixedly secures the cone-shaped member 94 to the boss 92. The axially outer (front) portion of the cone-shaped member 94 has a base portion to which an elastic pad 95 made of rubber is attached. When the cone-shaped member 94 is securely fixed in position, the elastic pad 95 is pressed against the inner wall of the transmission front cover 48 to suppress vibration of the front cover 48.

To the outer race 35b of the ball bearing 35 supporting the main shaft 51 is pressed a vibration-absorbing elastic member 100 through the suppressing plate 91, from the axially outer (front) side toward the ball bearing 35 and over the entire peripheral area of the ball bearing 35. The vibration-absorbing elastic member 100 has an abutment surface 100a for indirect abutment with the outer race. A cone-shaped cap member 101 made of metal is in abutment with the vibration-absorbing elastic member 100 on the opposite side of the abutment surface 100a. The cap member 101 extends axially outward (to the front) and is fixedly secured at the top thereof, by the tightening bolt 93, to the boss 92 of the front cover 48, together with the cone-shaped member 94.

The tightening bolt 93 is provided with a bolt head 93b and an extension 93c extending inward. The tightening bolt 93 has therein a connecting lubricant passage 93a extending throughout the entire length thereof. The extension 93c is located within the cone-shaped cap member 101.

In the present embodiment, the volume of the vibration-absorbing elastic member 100 is set to be 50% or more of the volume of the outer race 35b of the ball bearing 35. With the use of such volume of the vibration-absorbing elastic member 100 pressed against the outer race 35b of the ball bearing 35, vibration of the outer race 35b can be suppressed effectively. The volume of the vibration-absorbing elastic member 100 is more desirably 100% or more of the volume of the outer race 35b. In this case, vibration-absorbing or suppressing effect on the outer race 35b can be increased to a maximum.

With the above measures, it is possible to suppress vibration of the outer race 35b of the ball bearing 35 for the main shaft 51, which vibration occurs as a result of vibration produced due to meshing engagement of the dog clutches, such as the dog clutches 55 and 56, etc., on the main shaft 51 and resultant transmission of the vibration to the shifter, the main shaft 51, and the outer race 35b of the ball bearing 35 supporting the main shaft 51.

Therefore, possible transmission of the vibration from the main bearing holding part 90, in which the outer race 35b is supported, of the transmission holder 46, to the transmission holder 46 and to the front cover 48 is reduced or suppressed, whereby production and release of striking noise to the outside of the transmission 5 due to the shifting is reduced.

According to experiments carried out, striking sounds or noises were produced to a considerable degree due to the shifting operations, in case the volume of the vibration-absorbing elastic member 100 was set less than 50% of the volume of the outer race 35b of the ball bearing 35, whereas striking sounds or noises were greatly reduced in case the volume of the vibration-absorbing elastic member 100 was set to 50% or more of the volume of the outer race 35b of the ball bearing 35. Further, striking sounds or noises were not produced in case the volume of the vibration-absorbing elastic member 100 was set to 100% or more of the volume of the outer race 35b of the ball bearing 35.

The provision of the female screw hole 92a in the boss 92 of the transmission front cover 48, for screw engagement with the tightening bolt 93 for fixing the cone-shaped metal cap member 101, makes it possible to securely fix the cone-shaped cap member 101 to the side of the front cover 48 and to thereby securely press the vibration-absorbing elastic member 100 to the outer race 35b with a predetermined tightening degree along the entire circumferential area of the outer race 35b.

The main shaft 51 is formed therein with a lubricant passage 51b extending in the axial direction and connected to parts to be lubricated in the neighborhood of the main shaft 51. The lubricant passage 51b is open in the front side 51a thereof. The connecting lubricant passage 93a of the tightening bolt 93 opens at both ends thereof. The lubricant passage 51b is confined and closed in the outer (front) side of the ball bearing 35 by the vibration-absorbing elastic member 100 and the cone-shaped cap member 101.

For this reason, the vibration-absorbing elastic member 100 is not only utilized to reduce or suppress vibration but also utilized as a sealing member for defining a lubricant space serving to connect the lubricant passage 92b in the front cover 48 to the lubricant passage 51b in the main shaft 51. Thus, lubricant can be supplied reliably from the lubricant passage 92b in the front cover 48 through the female screw hole 92a in the boss 92 and through the communication lubricant passage 93a in the tightening bolt 93, so that lubricant supply passages into the main shaft 51 is readily formed.

Figure 6:
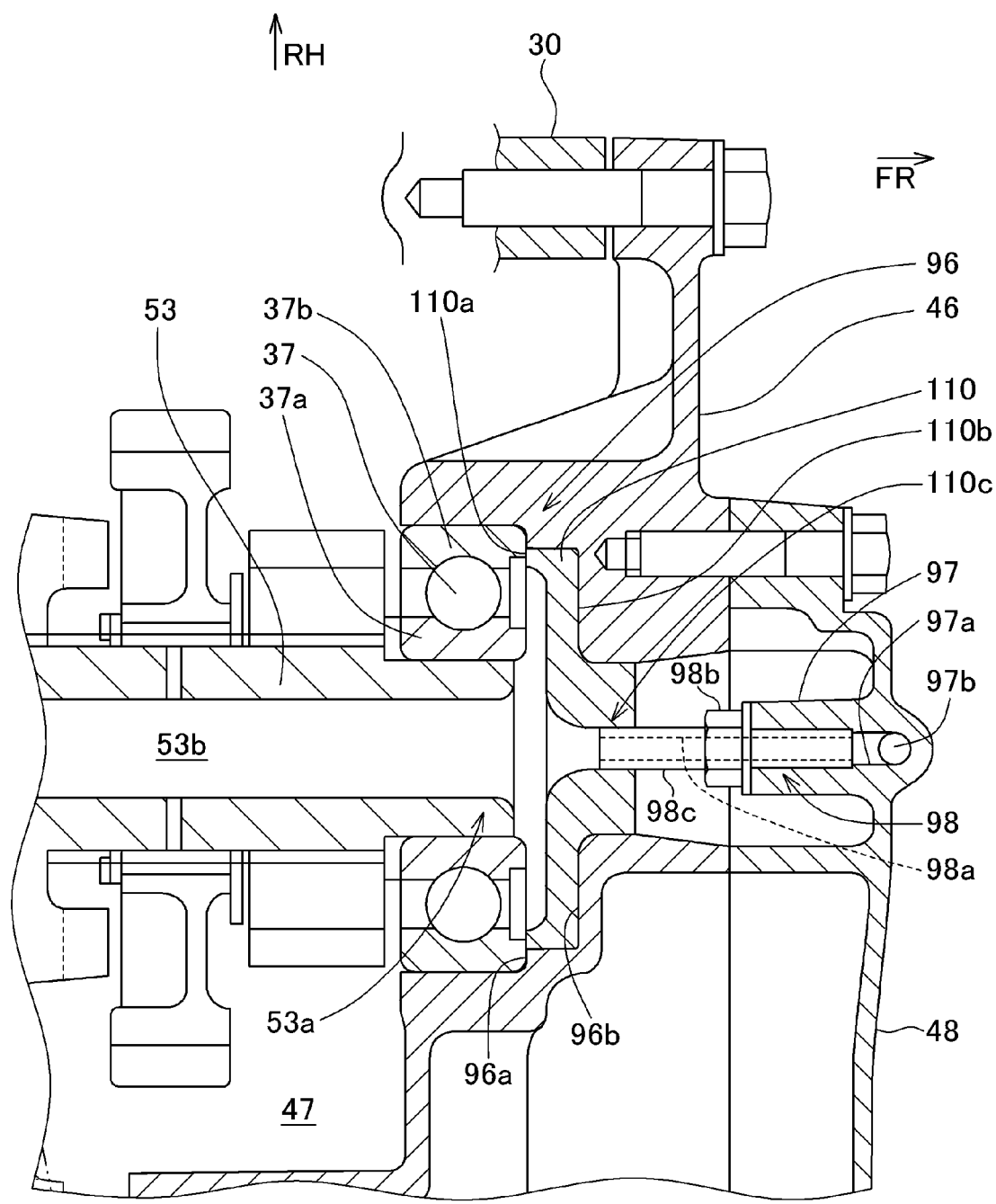
FIG. 6 is an enlarged view showing a part including a ball bearing for a counter shaft and the vibration-absorbing elastic member shown in FIG. 4.

As shown in FIG. 4 and in FIG. 6 in more detail, the front side 53a of the counter shaft 53 is supported through a ball bearing 37 in a counter shaft bearing holding part 96 forming a part of the transmission holder 46. The ball bearing 37 has its inner race 37a fitted on the front side 53a of the counter shaft 53, while an outer race 37b of the ball bearing 37 is prevented to move toward the outside (front) along the entire peripheral area thereof by means of a vibration-absorbing elastic member 110.

The vibration-absorbing elastic member 110 has an outer race abutment part 110a from which integrally extends a cap part 110b radially inward and then axially outward (to the front).

The counter shaft bearing holding part 96 of the transmission holder 46 is formed with a bearing positioning shoulder part 96a for abutting engagement with the outer race 37b and a cap part positioning shoulder part 96b for abutting engagement with the cap part 110b.

By adjusting the axial size or thickness of the vibration-absorbing elastic member 110 in relation to the height difference or axial distance between the bearing positioning shoulder part 96a and the cap part positioning shoulder part 96b, the interference or tightening degree imparted to the outer race 37b can be determined.

When the vibration-absorbing elastic member 110 with the cap part 110b is made of an integral molded rubber member, its production cost can be reduced. Further, because of the configuration of the counter shaft bearing holding part 96 of the transmission holder 46, it is possible to exactly set the interference or tightening degree of the vibration-absorbing elastic member 110 in relation to the outer race 37b. For this reason the vibration-absorbing elastic member 110 can be reliably pressed against the outer race 37b along the entire circumference thereof without increasing the number of the component elements.

The volume of the vibration-absorbing elastic member 110 is set 50% or more of the volume of the outer race 37b of the ball bearing 37. With the use of such volume of the vibration-absorbing elastic member 110 pressed against the outer race 37b of the ball bearing 37, vibration of the outer race 37b can be suppressed effectively. The volume of the vibration-absorbing elastic member 110 is more desirably 100% or more of the volume of the outer race 37b. In this case, vibration-absorbing or suppressing effect on the outer race 37b can be increased to a maximum.

With the above measures, it is possible to absorb vibration of the outer race 37b of the ball bearing 37 for the counter shaft 53, which vibration occurs as a result of vibration occurring due to engagement of the dog clutches 57 and 58, etc., on the counter shaft 53 and resultant transmission of the vibration to the shifter, the counter shaft 53, and the outer race 37b of the ball bearing 37 supporting the counter shaft 53.

As a result, possible transmission of the vibration from the counter bearing holding part 96, in which the outer race 37b is supported, of the transmission holder 46, to the transmission holder 46 and to the front cover 48 is reduced, whereby production and release of striking noise to the outside of the transmission 5 due to the shifting is reduced.

According to experiments carried out, striking noises were produced to a considerable degree due to the shifting operations, in case the volume of the vibration-absorbing elastic member 110 was set less than 50% of the volume of the outer race 37b of the ball bearing 37, whereas striking noises were greatly reduced in case the volume of the vibration-absorbing elastic member 110 was set to 50% or more of the volume of the outer race 37b of the ball bearing 37. Further, striking noises were not produced in case the volume of the vibration-absorbing elastic member 110 was set to 100% or more of the volume of the outer race 37b of the ball bearing 37.

The counter shaft 53 is formed therein with a lubricant passage 53b extending in the axial direction and connected to parts to be lubricated in the neighborhood of the counter shaft 53. The lubricant passage 53b is open in the front side 53a thereof, while the cap part 110b has therein a lubricant passage 110c coaxial with the center axis of the counter shaft 53.

Since the cap part 110b of the vibration-absorbing elastic member 110 is pressed against the outer race 37b of the ball bearing 37 along the entire peripheral area of thereof, the axially outside (front) area of the ball bearing 37 is closed except in the lubricant passage 110c.

Thus, the vibration-absorbing elastic member 110 is not only utilized to reduce vibration but also utilized as a sealing member for defining a lubricant space in the vibration-absorbing elastic member 110 by connecting the lubricant passage 110c to the lubricant supply source.

In the present embodiment, in more detail, a lubricant supply boss 97 is formed on the inner surface of the front cover 48 at a position coaxial with the counter shaft 53, so as to protrude inward (rearward). The lubricant supply boss 97 has a female-screw hole 97a as a lubricant supply hole, and the female-screw hole 97a is in communication with a lubricant supply passage 97b connected to the lubricant supply source.

In the female-screw hole 97a is screwed, from the inside of the front cover 48, a lubricant supply bolt (lubricant supply pipe) 98 formed therein with a communication passage 98a extending through the female-screw hole 97a.

The lubricant supply bolt 98 has a bolt head 98b and an extended portion 98c extending rearward from the bolt head. The extended portion 98c is fitted tightly in the cap part 110b of the vibration-absorbing elastic member 110, thereby to form the lubricant passage 110c.

The above simple construction ensures lubricant supply from the transmission front cover 48 into the interior space of the cap part 110b of the vibration-absorbing elastic member 110, while the vibration-absorbing elastic member 110 is utilized for suppressing vibration. More particularly, by using the sealing property of the vibration-absorbing elastic member 110, lubricant supply is made from the lubricant supply passage 97b in the front cover 48 through the female-screw hole 97a in the lubricant supply boss 97 and through the communication passage 98a in the lubricant supply bolt 98, whereby the cap part 110b is utilized to form therein a lubricant path connecting the lubricant supply passage 97b in the front cover 48 to the lubricant passage 53b in the counter shaft 53, making it easy to constitute a lubricant path leading into the counter shaft 53.

The transmission according to the preferred embodiment of the invention has been described above. It will however be understood that the present invention is not limited to the embodiment described but can be embodied in various forms within the scope of the invention.

For example, the transmission can be embodied within the scope of the invention defined in the claims. According to the scope of the invention, the number of the speed change steps is not limited to that disclosed above. The main shaft could be connected to a single clutch mechanism or to a dual clutch mechanism including two clutches. The vibration-absorbing elastic member can be provided in one of the main shaft and the counter shaft.

The ball bearings are used in the above embodiment, but roller bearings and the like may be used if the bearings are of the type including inner and outer races.

In the embodiment disclosed above, the vibration-absorbing elastic member 100 and its associated members for the main shaft 51 may be used for the counter shaft 53, and the vibration-absorbing elastic member 110 and its associated members for the counter shaft 53 may be used for the main shaft 51. Further, one of the assembly including the vibration-absorbing elastic member 100 and its associated members and the assembly including the vibration-absorbing elastic members 110 and its associated members may be used for both the main shaft 51 and the counter shaft 53.

The power unit disclosed above is not limited to the type in which the shafts including the crank shaft are arranged to extend in the front-to-rear direction of the vehicle, but may be the type in which the shafts including the crank shaft are arranged to extend in the transverse (left-right direction) of the vehicle. Further, engine is not limited to the horizontally-opposed type and the vehicle is not limited to that disclosed.

For convenience of explanation, the specific arrangement of various elements, shown in the drawings, with respect to the transverse direction of the vehicle has been described above. However, an opposite arrangement to that disclosed with respect to the transverse direction may also be included in the scope of the invention.

REFERENCE LETTERS

3 . . . Power unit, 4 . . . Internal combustion engine, 5 . . . Transmission, Gear change mechanism, 30 . . . Crankcase, 31 . . . Crankshaft, 46 . . . Transmission holder (Part of the transmission cover), 50 . . . Gear change mechanism, 51 . . . Main shaft, 51a . . . Front side, 51b . . . Lubricant passage, 53 . . . Counter shaft, 53a . . . Front side, 53b . . . Lubricant passage, 55 . . . Dog clutch A, 56 . . . Dog clutch B, 57 . . . Dog clutch C, 58 . . . Dog clutch D, 60 . . . $7^{th}$ drive gear (fixed gear), 61 . . . $7^{th}$ driven gear, 62 . . . $3^{rd}$ drive gear (shifter gear), 63 . . . $3^{rd}$ driven gear (fixed gear), 64 . . . $5^{th}$ drive gear (fixed gear), 65 . . . $5^{th}$ driven gear (shifter gear), 66 . . . $1^{st}$ drive gear, 67 . . . $1^{st}$ driven gear (fixed gear), 68 . . . $1^{st}$ shifter, 69 . . . $2^{nd}$ shifter, 70 . . . Shift drum, 90 . . . Main bearing holding part, 92 . . . Boss, 92a . . . Female screw hole (lubricant supply hole), 92b . . . Lubricant passage, 93 . . . Tightening bolt, 93a . . . Lubricant passage, 96 . . . Counter shaft bearing holding part, 96a . . . Bearing positioning shoulder part, 96b . . . Cap part positioning shoulder part, 97 . . . Lubricant supply boss, 97a . . . Female-screw hole (lubricant supply hole), 98 . . . Lubricant supply bolt (lubricant supply pipe), 98a . . . Communication passage, 100 . . . Vibration-absorbing elastic member, 100a . . . Outer race abutment surface, 101 . . . Cap member, 110 . . . Vibration-absorbing elastic member, 110a . . . Outer race abutment part, 110b . . . Cap member, 110c . . . Lubricant passage

The invention claimed is:

1. A transmission comprising a main shaft having thereon a plurality of first gears and supported through a bearing by a transmission case, and a counter shaft having a plurality of second gears thereon and supported through a bearing by the transmission case, the first gears including shifter gears not rotatable but axially shiftable relative to the main shaft and fixed gears rotatable but axially not shiftable relative to the main shaft, the second gears including shifter gears not rotatable but axially shiftable relative to the counter shaft and fixed gears rotatable but axially not shiftable relative to the counter shaft, dog clutches being interposed between the shifter gears and the fixed gears, respectively;

wherein each of said bearings includes an inner race, and an outer race fixedly mounted in the transmission case; characterized in:

that a vibration-absorbing elastic member is provided so as to be pressed from outside toward at least one of said bearings against the outer race of said one bearing for the main or counter bearings;

that said vibration-absorbing elastic member is set to have a volume of 50% or more of a volume of the outer race, pressed against the same, of said one bearing;

that the vibration-absorbing elastic member has an abutment surface in abutment with the associated outer race, and a cone-shaped cap member made of a metal is provided to extend integrally and axially outward and radially inward on axially opposite side of the abutment surface; and that the transmission case has a transmission front cover positioned to confront the cone-shaped cap member and formed with a protruding boss having a female screw hole therein, and a tightening bolt is screwed in the female screw hole to fixedly secure the cone-shaped cap member to the transmission front cover.

2. The transmission according to claim 1, wherein at least one of the main and counter shafts, with which the vibration-absorbing elastic member is associated, has a lubricant passage therein; and the tightening bolt screwed in the female screw hole has therein a connecting lubricant passage communicating with a lubricant supply passage.

3. The transmission according to claim 1, wherein said vibration-absorbing elastic member is set to have a volume of 100% or more of a volume of the outer race, pressed against the same, of said one bearing.

4. The transmission according to claim 1, wherein said vibration-absorbing elastic member is set to have a volume of 100% or more of a volume of the outer race, pressed against the same, of said one bearing.

5. A transmission comprising a main shaft having thereon a plurality of first gears and supported through a bearing by a transmission case, and a counter shaft having a plurality of second gears thereon and supported through a bearing by the transmission case, the first gears including shifter gears not rotatable but axially shiftable relative to the main shaft and fixed gears rotatable but axially not shiftable relative to the main shaft, the second gears including shifter gears not rotatable but axially shiftable relative to the counter shaft and fixed gears rotatable but axially not shiftable relative to the counter shaft, dog clutches being interposed between the shifter gears and the fixed gears, respectively;

wherein each of said bearings includes an inner race, and an outer race fixedly mounted in the transmission case; characterized in:

that a vibration-absorbing elastic member is provided so as to be pressed from outside toward at least one of said bearings against the outer race of said one bearing for the main or counter bearings;

that said vibration-absorbing elastic member is set to have a volume of 50% or more of a volume of the outer race, pressed against the same, of said one bearing;

that the vibration-absorbing elastic member has an abutment surface in abutment with the associated outer race, and a cap part integrally extending axially outward and radially inward;

that the transmission case has a bearing holding part with a bearing positioning shoulder part in abutting engagement with the associated outer races, and a cap part positioning shoulder part in abutting engagement with the cap part;

that the vibration-absorbing elastic member is set to have an interference or tightening degree relative to the associated outer race, depending on axial distance between the bearing positioning shoulder part and the cap part positioning shoulder part, wherein at least one of the main and counter shafts, with which the vibration-absorbing elastic member is associated, has a lubricant passage;

the cap part has therein a lubricant passage for supplying lubricant into at least one of the main and counter shafts, and wherein the transmission case has a transmission cover with a lubricant supply hole formed therein, and a lubricant supply bolt communicating with the lubricant supply hole is tightly fitted in the cap part to form the lubricant passage.

6. A transmission comprising a main shaft having thereon a plurality of first gears and supported through a bearing by a transmission case, and a counter shaft having a plurality of second gears thereon and supported through a bearing by the transmission case, the first gears including shifter gears not rotatable but axially shiftable relative to the main shaft and fixed gears rotatable but axially not shiftable relative to the main shaft, the second gears including shifter gears not rotatable but axially shiftable relative to the counter shaft and fixed gears rotatable but axially not shiftable relative to the counter shaft, dog clutches being interposed between the shifter gears and the fixed gears, respectively;

wherein each of said bearings includes an inner race, and an outer race fixedly mounted in the transmission case; characterized in:

that a vibration-absorbing elastic member is provided so as to be pressed from outside toward at least one of said bearings against the outer race of said one bearing for the main or counter bearings;

that said vibration-absorbing elastic member is set to have a volume of 50% or more of a volume of the outer race, pressed against the same, of said one bearing;

that the vibration-absorbing elastic member has an abutment surface in abutment with the associated outer race, and a cap part integrally extending axially outward and radially inward;

that the transmission case has a bearing holding part with a bearing positioning shoulder part in abutting engagement with the associated outer races, and a cap part positioning shoulder part in abutting engagement with the cap part;

that the vibration-absorbing elastic member is set to have an interference or tightening degree relative to the associated outer race, depending on axial distance between the bearing positioning shoulder part and the cap part positioning shoulder part, wherein at least one of the main and counter shafts, with which the vibration-absorbing elastic member is associated, has a lubricant passage; and the cap part has therein a lubricant passage for supplying lubricant into at least one of the main and counter shafts.

\* \* \* \* \*